Patented Sept. 19, 1933

1,927,041

UNITED STATES PATENT OFFICE 1,927,041

CANDY AND METHOD OF MAKING SAME

James E. Mayhew, New York, N. Y.

No Drawing. Application September 11, 1929
Serial No. 391,977

5 Claims. (Cl. 99—16)

This invention relates to the manufacture of candy, and its object is to provide improved candy and an improved method of making the same. More particularly, the invention aims to provide an improved licorice candy adapted to be pressed and molded into desired conformations, and having a high lustre.

In the heretofore customary method of making licorice candies, the mixtures are cooked and pressed or formed into desired shapes, but it is found that these candies do not withstand climatic changes well. In a dry climate the candy tends to lose moisture, and in a moist climate, the candy picks up moisture and becomes sticky. The heretofore customary candies, when exposed to low temperatures, become extremely brittle and hard. Heretofore, no specific provision has been made to produce a licorice candy which does not vary in texture with extremes of climatic conditions.

A formula which is largely used for the production of licorice candy includes the following ingredients:

40% invert sugar
29% strong wheat flour
25% water
3% licorice extract
2% sugar coloring
.8% carbon coloring
.2% aniseed oil.

It is customary to mix together the syrup and flour thoroughly until the paste becomes free of lumps. This mixing is accomplished without heating. The remaining ingredients are then added, with the exception of the flavoring. The batch is then cooked with steam at from twenty to twenty-five pounds pressure with continuous agitation for a period of from five and one-half to six and one-half hours.

Material made in accordance with this method is extremely susceptible to climatic changes. In cold weather the formed pieces of candy become very brittle and break readily. In warm weather, the candy pieces soften readily and adhere to each other. The finished candy has a tendency to become tough and leathery, while the finished surface of the material is dull and lacks lustre.

I have found that by the addition of certain ingredients and by following certain manipulative steps that an improved licorice candy may be made which has a desirable high lustre when formed or molded into a finished product, and which is not susceptible readily to normal climatic changes. In the practice of the invention, the body or base of the licorice candy is made up in substantially the same manner as has heretofore been customary. I have found, however, that certain ingredients added to the batch while cooling impart thereto not only a desirable texture, but also a desirable finish and the ability to withstand climatic changes.

In the practice of the invention, I have found it advantageous to use a formula substantially as follows:

38% invert sugar
29% strong wheat flour
25% water
3% licorice extract
2% sugar coloring
.8% carbon coloring
.2% aniseed oil
1% glycerine
.6% chocolate liquor
.4% vegetable butter.

Due to variations in raw materials of this nature, it may be necessary at times to alter the above formula slightly to compensate for variations in natural products, which are almost impossible to obtain uniform from year to year, but, for all practical purposes, the formula remains as it is given.

In the practice of the invention, the same procedure is followed as is customary in the manufacture of licorice candy. The flour and syrup are mixed together while cold, until a smooth mixture is obtained, then the other materials, with the exception of the flavoring oil, glycerine, chocolate and vegetable butter, are added and the mass cooked by means of steam at a pressure of from twenty to twenty-five pounds for a period of from five and one-half to six and one-half hours with constant agitation. At this point the heat is turned off, the flavoring oil added, and the material permitted to cool while still being agitated.

When the material reaches a temperature of about 140° F., a relatively small amount of chocolate liquor, say .6%, is added. The addition of the chocolate liquor breaks down part of the body of the mixture and destroys a certain amount of the elasticity or ductility of the batch. The addition of the chocolate liquor in the amounts in which it is used does not destroy the entire ductility of the mass, but the mass remains in such shape that it may still be worked while remaining at a temperature in the neighborhood of 140° F. Later, when the mass becomes thoroughly cooled, the chocolate addition causes the material to become short and tender in texture, making it more palatable and more easily masticated.

After the chocolate liquor has been thoroughly incorporated into the batch, a relatively small amount of glycerine, substantially 1%, is added in the same manner that the chocolate liquor was added, and thoroughly incorporated into the mass by continuous agitation. The addition of the liquid glycerine adds moisture to the mixture and thus makes the mass more pliable or flexible.

The hydroscopic property of the glycerine tends to maintain the water content of the finished mass at the right point, thus preventing the finished candy from drying out or becoming too brittle, and also assisting in overcoming the effects of extremely cold temperatures.

When the entire mass has cooled down to substantially a temperature advantageous for extruding or molding the finished articles, a relatively small amount, substantially .4% of vegetable butter, is incorporated into the mixture and thoroughly worked in by means of the agitator. The addition of the vegetable butter causes the finished extruded or molded articles to have a high lustre or finish. This lustre or finish on the exterior of the finished candies, being of an oily nature, aids materially in counteracting the deleterious effects of moisture conditions of the atmosphere. Thus, a finish of this nature prevents the candy from absorbing moisture from a moisture laden atmosphere and at the same time prevents the loss of moisture from the candy in an extremely dry atmosphere.

The three special ingredients which are added during the cooling stage of the process of candy manufacture can only be added at this stage. If they are incorporated into the batch during the cooking process, harmful effects are certain to result. The chocolate, at the higher temperatures of the cooking stage, would break down the entire elasticity or ductility of the batch because at these temperatures the chocolate would entirely react with some of the other ingredients and the material would become so short that it would be impossible to manipulate it into the proper forms or designs.

The glycerine also, if added at the higher temperatures, would react to form new compounds with other ingredients of the mixture. These new compounds would not have the desirable effects upon the moisture and general texture of the mass which is obtained when the glycerine is added at a lower temperature and during the cooling stage of the process.

If the vegetable butter is added during the high temperatures of the cooking stage, it combines with other ingredients of the compound and, as a consequence, when the finished articles are formed they do not have the desired lustre which is present when the vegetable butter is added at the later stage of the process and at a time when it does not have a chance to combine with other ingredients.

The use of the three additive agents, chocolate, glycerine and vegetable butter in proper proportions, makes it possible to obtain almost any desired texture and finish, almost regardless of the composition of the main mass of materials which comprise the cooked portion. The quantity of glycerine incorporated into the mass determines largely the flexibility of the finished article. The amount of chocolate used determines the ductility of the material, a shorter material being the result of greater amounts of chocolate. The degree and quality of the lustre is dependent on the amount of vegetable butter used, a higher lustre resulting from a greater quantity of vegetable butter.

Throughout the specification and the appended claims I have used the terms glycerine, chocolate or chocolate liquor, and vegetable butter in referring to the additive agents which are the subject of the invention. Glycerine means the customary commercial glycerine and includes all special types, such as chemically pure or U. S. P. glycerine or aqueous solutions of the same. Chocolate or chocolate liquor is intended to refer to the customary chocolate liquor employed by confectioners and is a thick aqueous syrup. This term, however, includes the use of ground chocolate in any suitable form. Vegetable butter includes a single vegetable oil hard at ordinary temperatures or a blend of various vegetable oils or fatty acids resembling customary butter in composition. I do not wish to confine myself to these special agents but intend to use them or their substantial equivalents.

It is highly important that these agents be not added during the cooking process where they will combine at least in part with other ingredients of the mass and thus lose their peculiar identity and properties, but that they be added at a very late stage in the cooling process. The addition of these materials at this stage permits each to exert its peculiar and individual effect and permits this effect to be strikingly apparent in the finished article and to be apparent in a totally different manner than had the same material been added during the cooking stage as one of the regular ingredients.

Certain proportions of ingredients in the main mass of the candy have been given. It is understood that these proportions are given merely by way of indicating a foundation and that any of these amounts may be changed slightly to compensate for the usual variations of raw materials of this general type, the quality of which may vary slightly with each shipment.

I claim:

1. In the method of making licorice candy, the improvement which comprises adding to a cooked batch at a temperature not over about 140° F. substantially .6 of 1% of chocolate liquor, substantially one percent of glycerine and substantially .4 of 1% of vegetable butter.

2. The method of making licorice candy which comprises cooking a mixture comprising invert sugar, wheat flour, water, licorice extract, coloring and flavoring, permitting the resulting mass to cool to a temperature of not over about 140° F., mixing a relatively small amount of chocolate liquor with the said mass, mixing a relatively small amount of glycerine with the prepared mass and mixing a relatively small amount of vegetable butter to the resulting mass.

3. The steps in the method of making licorice candy which comprises adding to the cooling mixture chocolate liquor to reduce the ductility of the cooling mass, glycerine to increase the flexibility and preserve contained moisture, and vegetable butter to increase the lustre of the finished surface.

4. Licorice candy comprising 38% invert sugar, 29% wheat flour, 25% water, 3% licorice extract, 2% sugar coloring, .8 of 1% carbon coloring, .2 of 1% ainseed oil, 1% glycerine, .6 of 1% chocolate liquor, and .2 of 1% vegetable butter.

5. Licorice candy containing in relatively small amounts chocolate, glycerine and vegetable butter.

JAMES E. MAYHEW.